April 12, 1938.   J. T. CUNNINGHAM   2,113,981
AUTOMOBILE LIGHT SYSTEM
Filed March 9, 1937   2 Sheets-Sheet 1

April 12, 1938. J. T. CUNNINGHAM 2,113,981
AUTOMOBILE LIGHT SYSTEM
Filed March 9, 1937 2 Sheets-Sheet 2
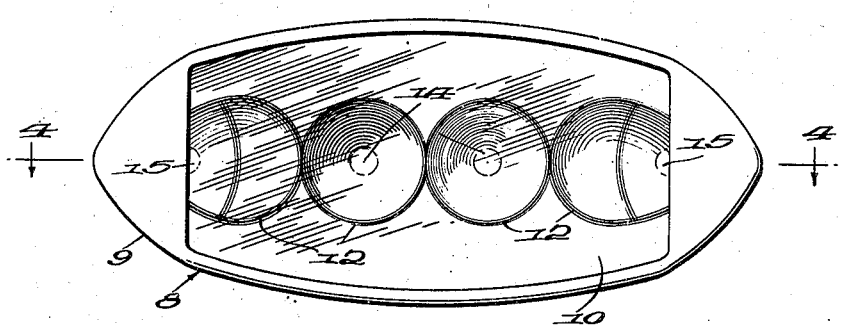
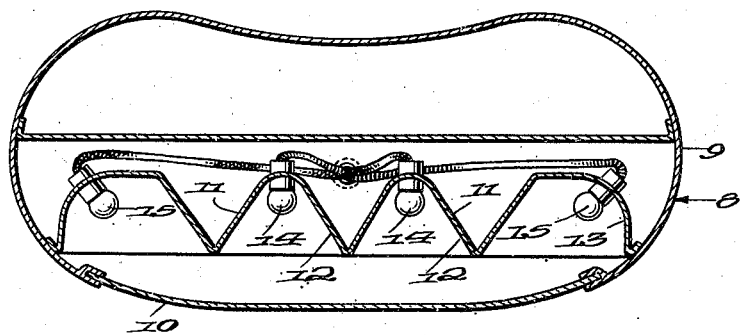
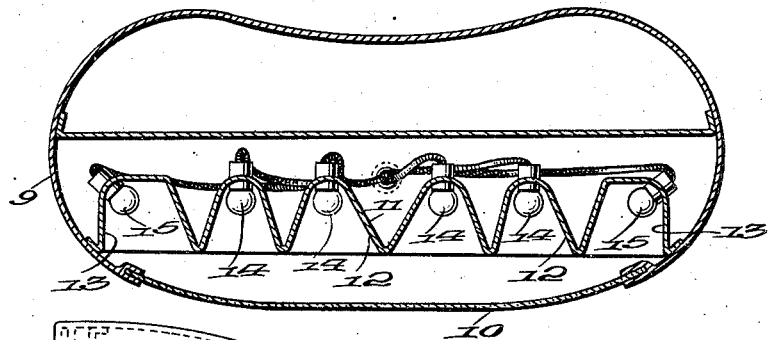
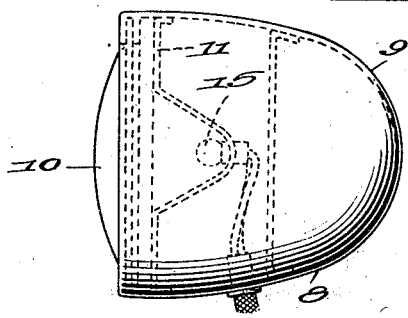

Patented Apr. 12, 1938

2,113,981

UNITED STATES PATENT OFFICE 2,113,981

AUTOMOBILE LIGHT SYSTEM

Joseph T. Cunningham, Cincinnati, Ohio

Application March 9, 1937, Serial No. 129,938

1 Claim. (Cl. 240—7.1)

My invention relates to automobile lights.

An object of my invention is to provide non-glare driving lights.

Another object is to provide parking or clearance lights operable in conjunction with driving lights.

A further object is to provide a system of lights which does away with the necessity of switching from bright to dim when meeting another car.

An important object is to provide underslung driving lamps suitable for driving in fog, and which will illuminate the sides of the road.

Further objects and advantages will appear from the following description.

In the drawings:

Figure 1 is a front perspective view of my lights installed on an automobile.

Figure 2 is the same view of the lights installed on a car having the present style of headlights.

Figure 3 is a front elevation of my driving light unit.

Figure 4 is a section on line 4—4 of Figure 3.

Figure 5 is a section similar to Figure 4 of a unit having four forwardly directed lights.

Figure 6 is an end elevation view of the unit, and

Figure 7 is a diagrammatic view of my switching arrangement.

In the drawings, which illustrate a preferred embodiment of my invention, and in which like numerals represent like parts throughout, the numeral 8 designates my improved headlight unit which may be formed of light sheet metal shell 9.

This unit 8 may be mounted in the position shown in Figures 1 and 2 on cars having divided bumpers, while on cars having a continuous bumper it may be hung below same.

The front of the unit is closed by a curved lens 10 which is removably mounted in same. Mounted at a suitable distance behind the lens is a reflector 11 formed substantially as a series of parabolic reflectors, the individual reflectors 12 of which are formed to throw the light straight ahead, while the end reflectors 13 direct the light inwards and across to the opposite sides of the road. The beams of light from the reflectors 13 will cross at a point over the road out in front of the car.

Each reflector section 12 is furnished with a lamp 14 while end reflectors 13 contain lamps 15.

Referring to Figure 1, it will be noted that upon the fenders of the car are mounted green or otherwise colored parking or passing lights 16, operable in conjunction with the headlight unit 8 in a manner to be described shortly. In the form of the invention shown in Figure 2, the usual headlamps 17 are used in lieu of the lights 16 of Figure 1, low power lamps and colored lenses being used instead of the usual high power white light equipment.

I will now describe the switching arrangement which is diagrammatically illustrated by Figure 7. A switch 19 mounted on the vehicle dash operates over contacts 20, 21, 22 for lamps 16, 15, and 14 respectively. The first position of the switch onto contact 20 illuminates the parking or clearance lights 16, Figure 1, or the lights 17 of Figure 2. The second switch position includes contact 21 lighting lamps 15 in cross reflectors 13, the lights 16 or 17 still being in the circuit. In the third and final position, contacts 20, 21, 22 are all covered by the blade of switch 19 and the lamps 14 are illuminated in addition to lamps 15 and 16 or 17. From the above description it can be seen that when only parking lights are desired, switch 19 will be set in its first position and only the lights 16, or 17 (Figure 2), will be lit through contact 20. The usual driving position of the switch will be position two which cuts in cross lights 15 of end reflectors through contact 21. When additional illumination is desired switch 19 is moved to number three which adds the direct ahead lights 14 through contact 22.

From the above description it can be seen that I have provided a novel system of vehicle lighting including a centrally located underslung headlight unit, which eliminates the discomfort of blinding and glaring lights to oncoming motorists, as well as the glare through the back windows of cars preceding in the same direction and in front of cars equipped with my device. These lights also do away with the necessity of switching the lights from bright to dim when meeting oncoming cars.

My lights are advantageous when driving through fog, the underslung position of same enabling most of the light to be projected under the fog giving the driver a more distant view in front, while the cross lights 15 illuminate the side of the road showing the driver how close he is to the edge of same. My device also eliminates the need of two headlights and adds to the streamlining effect of the car.

It should be understood that this description and accompanying drawings is to be taken as a preferred embodiment of my invention, and that changes in shape, size and arrangement of parts may be resorted to without departing from the spirit of the invention or the scope of the attached claim.

What I wish to claim by Letters Patent is:

An automobile headlight comprising a transversely elongated substantially oval casing having a front wall aperture bounded at each end by opposed parallel vertical straight edges, the length of the aperture being much less than the transverse extent of the casing whereby to provide light shroud portions at each end of the casing, a lens covering said aperture, a plane reflector plate mounted in the casing perpendicular to its major axis of light projection forwardly of the headlight and with the ends of the plate edge contacting the casing behind said light shroud portions approximately midway between said vertical aperture edges and the adjacent ends of the casing, a linear series of non-communicating dished reflectors formed in said plate in fixed relation with the side walls of adjacent reflectors converging and intersecting in the plane of said plate, and the reflector bottoms occupying a common plane, each endmost reflector having a parabolic wall between the plane of the reflector bottoms and the adjacent light shroud portion of the casing with its focal point substantially in the plane of the adjacent vertical straight edge of the casing aperture, light bulbs at the focal points of said reflectors, and the projection axes of said endmost reflectors converging and intersecting at a right angle in the center line of the headlight and forwardly of its lens.

JOSEPH T. CUNNINGHAM.